United States Patent
Mitamura et al.

[11] Patent Number: 5,855,531
[45] Date of Patent: Jan. 5, 1999

[54] COMPONENT PARTS OF A TOROIDAL-TYPE CONTINUOUSLY VARIABLE TRANSMISSION HAVING IMPROVED LIFE

[75] Inventors: Nobuaki Mitamura; Tsutomu Abe; Hideki Kokubu, all of Kanagawa, Japan

[73] Assignee: NSK Ltd., Tokyo, Japan

[21] Appl. No.: 745,635

[22] Filed: Nov. 8, 1996

Related U.S. Application Data

[63] Continuation of Ser. No. 374,179, Jan. 18, 1995, abandoned.

[30] Foreign Application Priority Data

Jan. 18, 1994 [JP] Japan .................................. 6-003772

[51] Int. Cl.$^6$ ............................. F16H 15/38; F16H 37/02
[52] U.S. Cl. ............................................. 476/46; 384/625
[58] Field of Search ............................. 476/46; 384/625, 384/492

[56] References Cited

U.S. PATENT DOCUMENTS

| | | | |
|---|---|---|---|
| 4,909,092 | 3/1990 | Machida et al. | 476/46 |
| 5,007,298 | 4/1991 | Machida | 476/46 |
| 5,361,648 | 11/1994 | Murakami et al. | 74/569 |
| 5,391,126 | 2/1995 | Fukushima et al. | 476/46 |

FOREIGN PATENT DOCUMENTS

| | | | |
|---|---|---|---|
| A20389790 | 10/1990 | European Pat. Off. . | |
| 63-106456 | 5/1988 | Japan | 476/46 |
| 249411 | 12/1990 | Japan . | |
| 0578782 | 3/1993 | Japan . | |
| A2235698 | 3/1991 | United Kingdom . | |
| A2278127 | 11/1994 | United Kingdom . | |

OTHER PUBLICATIONS

Patent Abstracts of Japan, JP 63–303222 A, Apr. 6, 1989, vol. 13, No. 140.
Patent Abstracts of Japan, JP 4–54312 A, Jun. 3, 1992, vol. 16, No. 242.
Patent Abstracts of Japan, JP 4–203621 A, Nov. 16, 1992, vol. 16, No. 545.
Patent Abstracts of Japan, JP 5–288221 A, Feb. 8, 1994, vol. 18, No. 76.
"Fatigue Life Analysis for Traction Drives with Application to a Toroidal Type Geometry", Coy et al., NASA Technical Note (NASA TN D–8362), Washington, D.C., Dec. 1976, p. 16.
A.C.O. Sales Brochure, A.C.O. Engineering Ltd. 15 Red Lion Square, London, W.C.1 Brottby Variator, Continuously Variable Gear.

*Primary Examiner*—Rodney H. Bonck
*Assistant Examiner*—David Fenstermacher
*Attorney, Agent, or Firm*—Sughrue, Mion, Zinn, Macpeak & Seas, PLLC

[57] ABSTRACT

In a toroidal-type continuously variable transmission including input and output side disks and a pair of power roller bearings, rolling elements of the power roller bearings are made of a steel which is to be case hardened, a medium-carbon steel or a high-carbon steel which is such a steel as containing carbon in an amount of 0.2 wt % or more, and are subjected to a carbonitriding process and hardening and tempering treatments. The toroidal-type continuously variable transmission has a long life by improving the rolling life of the power roller bearings, the input side disks, and the output side disks.

12 Claims, 3 Drawing Sheets

HEAT TREATMENT II'

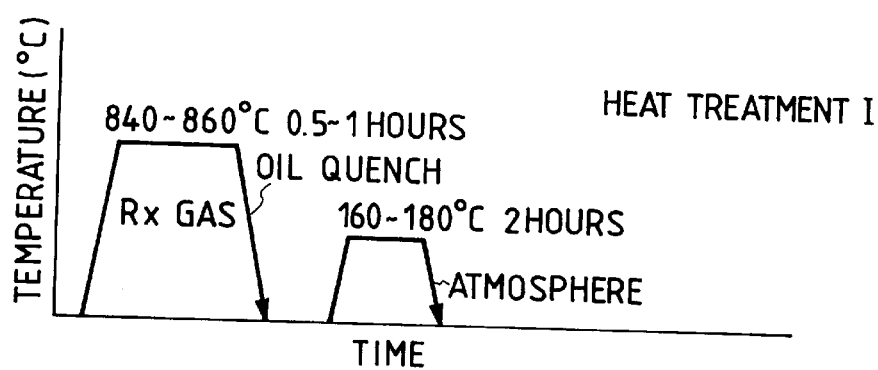
FIG. 4A — HEAT TREATMENT I
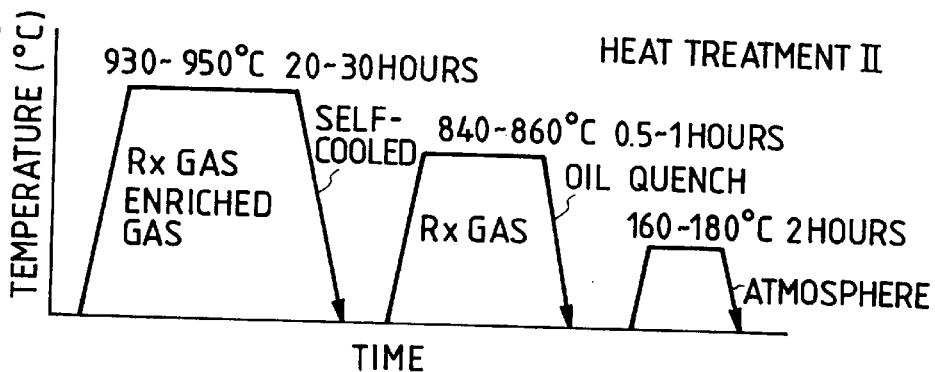
FIG. 4B — HEAT TREATMENT II
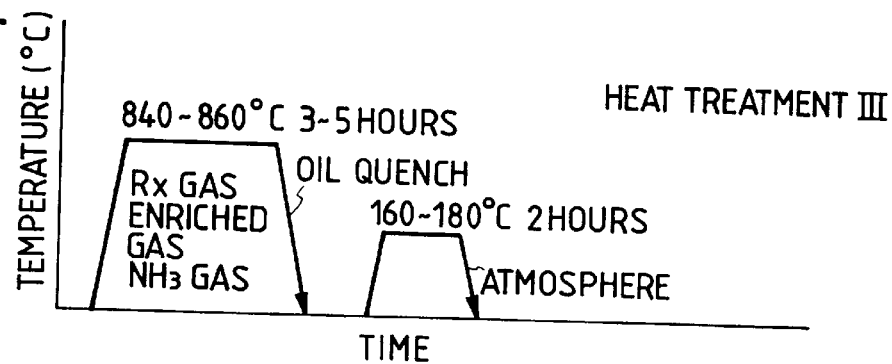
FIG. 4C — HEAT TREATMENT III
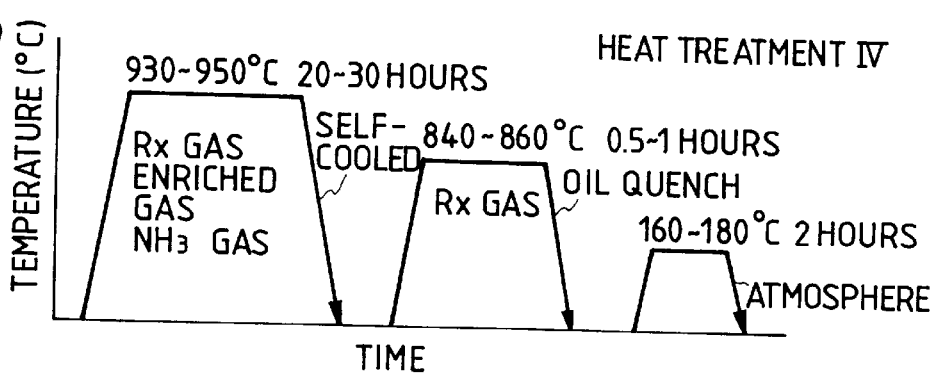
FIG. 4D — HEAT TREATMENT IV ID# COMPONENT PARTS OF A TOROIDAL-TYPE CONTINUOUSLY VARIABLE TRANSMISSION HAVING IMPROVED LIFE This is a Continuation of application Ser. No. 08/374,179 filed Jan. 18, 1995, now abandoned.

BACKGROUND OF THE INVENTION

The present invention relates to an improvement of a toroidal-type continuously variable transmission used in vehicles such as automobiles.

Conventionally, a toroidal-type continuously variable transmission, as shown, e.g., in FIG. 5, is constructed so that an input side disk 11 and an output side disk 12 are coaxially disposed and opposed to each other inside a housing (not shown).

An input shaft 13 passes through the shaft center of the toroidal transmission section having the input side disk 11 and the output side disk 12. A loading cam 14 is disposed on an end of the input shaft 13. The loading cam 14 transmits the motive power (rotational force) of the input shaft 13 to the input side disk 11 through a plurality of cam rollers 15.

The input side disk 11 and the output side disk 12, having substantially the same shape, are disposed to be symmetrical, and are formed to be substantially semicircular in section as viewed in the axial direction with both opposed surfaces thereof taken into view. A pair of power roller bearings 16 and 17 that transmit motion are disposed to be in contact with the input side disk 11 and the output side disk 12, respectively, within a toroidal cavity formed by the toroidal surfaces of the input side disk 11 and the output side disk 12.

The power roller bearing 16 includes: a power roller 16a that rolls over the toroidal surfaces of the input side disk 11 and the output side disk 12 (the power roller 16a being equivalent to an inner race constituting the power roller bearing 16); an outer race 16b; and a plurality of rolling elements (steel balls) 16c, and that the power roller bearing 17 includes: a power roller 17a that rolls over the toroidal surfaces of the input side disk 11 and the output side disk 12 (the power roller 17a being equivalent to an inner race constituting the power roller bearing 17); an outer race 17b; and a plurality of rolling elements (steel balls) 17c.

That is, the power roller 16a serves also as the inner race that is a component of the power roller bearing 16, and the power roller 17a serves also as the inner race that is a component of the power roller bearing 17.

In this construction the power roller 16a is pivotally attached to a trunnion 20 through a pivot shaft 18, the outer race 16b, and the plurality of rolling elements 16c, and pivotally supported with a pivot O as the center, the pivot O serving as the center of the toroidal surfaces of the input side disk 11 and the output side disk 12.

On the other hand, the power roller 17a is pivotally attached to a trunnion 21 through a pivot shaft 19, the outer race 17b, and the plurality of rolling elements 17c, and pivotally supported with a pivot O as the center, the pivot O serving as the center of the toroidal surfaces of the input side disk 11 and the output disk 12.

The surfaces of contact among the input side disk 11, the output side disk 12, and the power rollers 16a and 17a are supplied with a lubricating oil whose viscous frictional resistance is large, so that the motive power applied to the input side disk 11 is transmitted to the output side disk 12 through the lubricating oil film and the power rollers 16a and 17a.

The input side disk 11 and the output side disk 12 are independent of the input shaft 13 (i.e. are not directly affected by the motive power of the input shaft 13) by virtue of needle bearings 25. An output shaft 24 is attached to the output side disk 12. The output shaft extends in parallel with the input shaft 13 and is rotatably supported by the housing (not shown) through an angular bearing 22.

In this toroidal-type continuously variable transmission the motive power of the input shaft 13 is transmitted to the loading cam 14. When the loading cam 14 is rotated by the transmission of the motive power, this rotational power is transmitted to the input side disk 11 through the cam rollers 15, which in turn causes the input side disk 11 to rotate. The motive power generated by the rotation of the input side disk 11 is transmitted to the output side disk 12 through the power rollers 16a and 17a. The output side disk 12 rotates integrally with the output shaft 24.

At the time of changing the speed, the trunnions 20 and 21 are slightly moved toward the pivot O.

That is, the axial movement of the trunnions 20 and 21 puts the rotating shaft of the power rollers 16a and 17a and the shaft of the input side disk 11 and the output side disk 12 slightly out of intersection. Accordingly, the rotational circumferential speed of the power rollers 16a and 17a loses equilibrium with the rotational circumferential speed of the input side disk 11, and in addition a component of a drive force for rotating the input side disk 11 causes the power rollers 16a and 17a to swing about the pivot O.

As a result, the power rollers 16a, 17a pivot over the curved surfaces of the input side disk 11 and the output side disk 12, thereby changing the speed ratio to either accelerate or decelerate the motor vehicle.

Such a toroidal-type continuously variable transmission is disclosed, e.g., in Examined Japanese Utility Model Publication No. Hei. 2-49411. As conventional examples of the above-mentioned input side disk, output side disk, and power roller bearings, those using AISI52100 (an equivalent of JIS SUJ2 high carbon chromium bearing steel) are known as disclosed in "NASA Technical note, NASA ATN D-8362."

However, the above-mentioned toroidal-type continuously variable transmission produces, when driven, high contact stress (max: 3.5 to 4 GPa) between the input side disk and the power roller bearing and between the output side disk and the power rolling bearing, which in turn causes the power roller bearing to receive a high thrust load. Such a condition causes the conventional rolling bearing to permanently deform portions between the rolling elements and raceways of the inner and outer races.

If the power roller bearing is e.g., a ball bearing, it is known that spin slippage occurs on the power roller bearing upon reception of such a thrust load and that a portion of the power roller bearing subjected to the spin slippage is heated. The heat produced by the spin slippage increases the temperature of the rolling portion of the power roller bearing.

Further, when the power roller bearing is operated at a high speed and subjected to a high thrust load, an increase in the temperature of the rolling portion due to heat becomes so noticeable that the power roller bearing made of the conventional material exhibits the problem of early flaking and fracture.

Furthermore, the rolling element, in particular, which is a component of the power roller bearing, is susceptible to early flaking and fracture because the rolling element is operated under a condition in which heat conductivity is poor, which in turn brings about a significant reduction in the service life of the bearing.

SUMMARY OF THE INVENTION

The present invention has been made to overcome conventional problems. Accordingly, an object of the present invention is to provide a toroidal-type continuously variable transmission having a long life by improving the rolling life of the power roller bearing, the input side disk, and the output side disk in the toroidal-type continuously variable transmission.

To achieve the above object, the present invention is applied to a toroidal-type continuously variable transmission that includes: an input side disk disposed on an input shaft; an output side disk disposed on an output shaft; and a pair of power roller bearings including an inner race, an outer race, and a plurality of rolling elements and transmitting motive power of the input shaft to the output shaft while engaging the inner race with the input and output side disks, in which each of the rolling elements of the power roller bearing is made of a steel containing carbon in an amount of 0.2 wt % or more, and subjected to a carbonitriding process and hardening and tempering treatments.

In addition, the toroidal-type continuously variable transmission of the present invention may have each of the inner race and the outer race, which are components of the power roller bearing, and the input side disk and the output side disk made of a steel to be case hardened containing at least one of silicon (Si) in an amount ranging from 0.5 wt % to 1.5 wt % and molybdenum (Mo) in an amount ranging from 0.3 wt % to 1.0 wt %, and being subjected to a carburizing process or carbonitriding process and to hardening and tempering treatments.

Further, the toroidal-type continuously variable transmission of the present invention may be such that the steel to be case hardened, the medium-carbon steel, or the high-carbon steel, which is such a steel as containing carbon in an amount of 0.2 wt % or more, further contains oxygen (O) in an amount of 9 ppm or less, sulfur (S) in an amount of 0.010 wt % or less, and phosphorus (P) in an amount of 0.020 wt % or less.

Still further, the toroidal-type continuously variable transmission of the present invention may allow each of the inner race and the outer race, which are components of the power roller bearing, and the input side disk and the output side disk to have a residual compressive stress ranging from 40 to 150 kgf/mm$^2$ on a surface layer of a rolling surface thereof.

The term "surface layer" used herein is intended to mean an outer surface layer that extends 50 $\mu$m deep from the surface.

Still further, the toroidal-type continuously variable transmission of the present invention may allow the rolling element, which is a component of the power roller bearing, to have a residual compressive stress ranging from 40 to 150 kgf/mm$^2$ on the surface layer of a rolling surface thereof.

BRIEF DESCRIPTION OF THE DRAWINGS

In the accompanying drawings:

FIG. 4A is a diagram showing the heat treatment I applied to comparative examples according to the embodiment of the present invention;

FIGS. 4B to 4D are diagrams showing the heat treatments II, III and IV applied to examples according to the embodiment of the present invention, respectively;

DETAILED DESCRIPTION OF THE PREFERRED EMBODIMENTS

Figure 1:
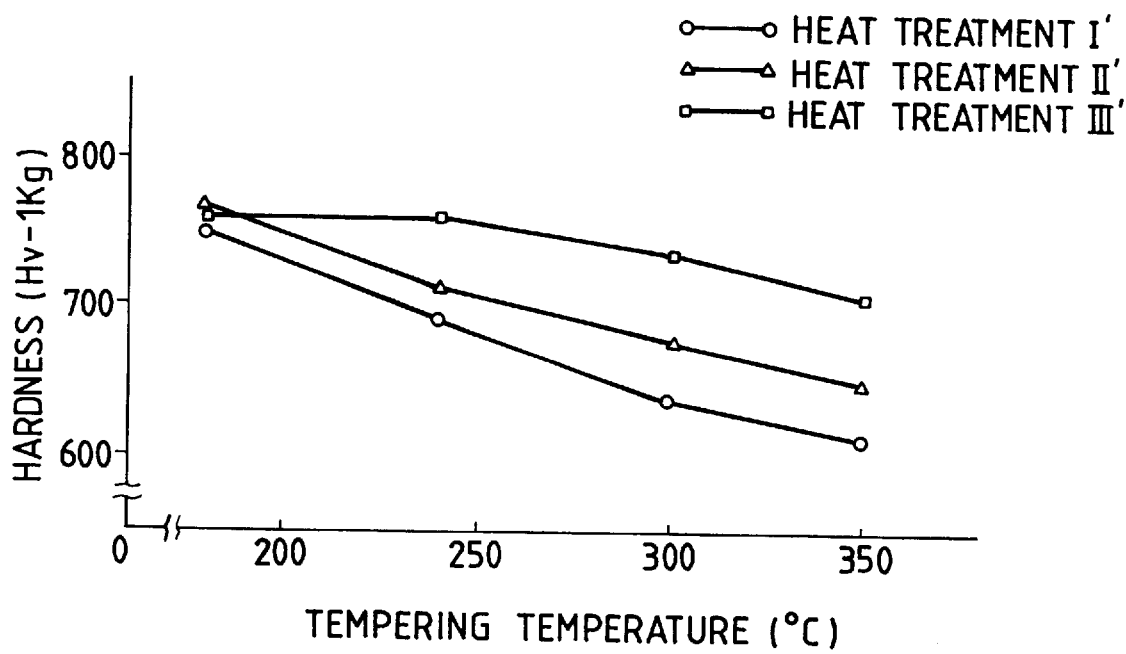
FIG. 1 is a diagram showing a relationship between the tempering temperature and the hardness of test pieces (HV) when the test pieces of a material A used in an embodiment of the present invention are subjected to heat treatments I, II and III.

An embodiment of the present invention will now be described with reference to the drawings. Since the general construction of a toroidal-type continuously variable transmission according to the present invention is the same as that of the conventional example (shown in FIG. 5), the description thereof will be omitted.

The toroidal-type continuously variable transmission of the present invention is characterized as having the rolling element of the power roller bearing, which is a component thereof, made of a medium-carbon steel or a high-carbon steel which is such a steel containing carbon in an amount of 0.2 wt % or more, and as subjecting the rolling element to a carbonitriding process and hardening and tempering treatments. Therefore, the rolling life of the power roller bearing, the input side disk, and the output side disk is improved, which in turn allows a toroidal-type continuously variable transmission having a long life to be obtained.

The reasons therefor will be described below.

When the toroidal-type continuously variable transmission is driven, the power roller bearing receives a large thrust load and is therefore rotated at a high speed. If the power roller bearing is a ball bearing, and when such power roller bearing rotates at a high speed while receiving a large thrust load, spin slippage occurs. When the spin slippage occurs, the rolling portion of the power roller bearing is heated, thus increasing the temperature of this portion. This phenomenon is verified also from a difference between the temperature of the incoming lubricating oil and the temperature of the outgoing lubricating oil from the power roller (the inner race) of the power roller bearing (the difference being in the order of 20° to 30° C.). The temperature of the rolling portion is assumed to be increased to at least 130° C.

It is assumed that the steel ball serving as the rolling element, which is a component of the power roller bearing, is particularly subjected to a severe condition in temperature, while the toroidal-type continuously variable transmission is being driven. Generally, bearing materials, when heated, exhibit a decrease in mechanical strength, which is represented by hardness, and a deterioration in fatigue properties.

In addition, when the spin slippage occurs on the rolling portion of the conventional bearing, minute cracks caused by tensile stress in a tangential direction appear on the rolling surface. These minute cracks grow into surface fatigue type flaking and fracture.

The reason why the material (a medium-carbon steel or a high-carbon steel) of which the rolling element is made is subjected to a carbonitriding process in the present invention is that the carbonitriding process allows carbon (C), and nitrogen (N) (particularly, nitrogen) to be dissolved into martensite, which is a matrix, in the form of a solid solution, and this in turn improves a resisting property for temper softening and prevents reduction in hardness at high temperatures.

Further, the martensite transformation temperature of the case of the rolling element is shifted from that of the core by making the carbon and nitrogen contents of the case different from those of the core, so that a residual compressive stress is produced on the surface of the rolling element after the hardening and tempering treatments. As a result, generation of minute cracks caused by tensile stress in the tangential direction of the surface is controlled, which in turn allows fatigue strength of the rolling element to be improved.

Moreover, the reason why a medium-carbon steel or a high-carbon steel is used as a material of which the rolling element is made is that such a material can provide strength necessary as a rolling part of the bearing within a comparatively short carbonitriding process time.

Still further, each of the inner race and the outer race, which are components of the power roller bearing, and the input side disk and the output side disk is made of a steel to be case hardened containing at least one of silicon (Si) in an amount ranging from 0.5 wt % to 1.4 wt % and molybdenum (Mo) in an amount ranging from 0.3 wt % to 1.0 wt %, and is subjected to a carburizing process or a carbonitriding process and to hardening and tempering treatments, and the thus obtained inner and outer races and input and output side disks are combined with the rolling elements according to the present invention. Such combination contributes to further improving the rolling life of the power roller bearing, the input side disk, and the output side disk, which in turn allows a toroidal-type continuously variable transmission having a longer life to be obtained.

The reason why silicon is added to a material of which each of the inner and outer races and the input and output side disks is made is that silicon (Si) is an alloy element that can improve the resisting property for temper softening significantly. The effect of significantly improving the resisting property for temper softening is noticeably exhibited when silicon is added in an amount of 0.5 wt % or more.

On the other hand, if silicon (Si) is added in an amount exceeding 1.5 wt %, diffusion of carbon (C) and nitrogen (N) at the time of carburizing or carbonitriding tends to be disturbed, thereby making it difficult to obtain a desired carburized or carbonitrided depth. Therefore, it is desirable that silicon (Si) be added within a range from 0.5 wt % to 1.5 wt % to the material of which each of the inner and outer races and the input and output side disks is made.

Further, the reason why molybdenum (Mo) is added to a material of which each of the inner and outer races and the input and output side disks is made is that molybdenum (Mo) is also an alloy element that can improve the resisting resistance for temper softening significantly like silicon (Si). The effect of significantly improving the resisting property for temper softening is noticeably exhibited when molybdenum is added in an amount of 0.3 wt % or more.

On the other hand, even if molybdenum (Mo) is added in an amount exceeding 1.0 wt %, such effect remains more or less the same. Therefore, it is desirable that molybdenum (Mo) is added to a material of which each of the inner and outer races and the input and output side disks is made within a range from 0.3 wt % to 1.0 wt %.

Further, the reason why the steel is subjected to a carburizing process or a carbonitriding process is to improve the resisting property for temper softening the case hardening steel by carbon (C) and nitrogen (N), and in addition to make martensite transformation temperature of the case different from that of the core by the carburizing or carbonitriding process, so that a residual compressive stress is produced on the rolling surface of the bearing.

In addition to the fact that the bearing section, the input side disk, and the output side disk are susceptible to flaking and fracture, the power roller bearing is subjected to repetitive bending stress, which makes the power roller bearing also susceptible to fatigue fracture. To improve fatigue fracture strength, it is desirable to impart a hardness gradient from the case to the core.

To achieve this, the present invention is characterized as using a steel to be case hardened as a material of which each of the inner and outer races and the input and output side disks is made, and as subjecting these components to a carburizing process or a carbonitriding process so as to impart a hardness gradient from the case to the core.

Still further, the steel to be case hardened and the medium- or high-carbon steel contains oxygen (O) in an amount of 9 ppm or less, sulfur (S) in an amount of 0.010 wt % or less, and phosphorus (P) in an amount of 0.020 wt % or less. This contributes to further improving the rolling life of the power roller bearing, the input side disk, and the output side disk, which in turn allows a toroidal-type continuously variable transmission having a longer life to be obtained.

If impurity elements such as oxygen (O) and sulfur (S) are present in the steel to be case hardened and the medium- or high-carbon steel in the form of nonmetallic inclusions, these elements cause defects, tending to adversely affect fatigue strength.

An oxygen (O) content in excess of 9 ppm in the steel to be case hardened and the medium- or high-carbon steel significantly aggravates negative effects on the fatigue strength. A sulfur (S) content in excess of 0.010 wt % in the steel to be case hardened and the medium- or high-carbon steel also significantly aggravates negative effects on the fatigue strength.

The presence of phosphorous (P) in the steel to be case hardened and the medium- or high-carbon steel impairs strength of the steel to be case hardened and the medium- or high-carbon steel by segregating in the grain boundaries thereof. A phosphorus (P) content in excess of 0.020 wt % in the steel to be case hardened and the medium- or high-carbon steel greatly impairs strength of the steel to be case hardened and the medium- or high-carbon steel.

Therefore, it is desirable that the steel to be case hardened and the medium- or high-carbon steel contain oxygen (O) in an amount of 9 ppm or less, sulfur (S) in an amount of 0.010 wt % or less, and phosphorous (P) in an amount of 0.020 wt % or less.

Still further, each of the inner race and the outer race, which are components of the power roller bearing, and the input side disk and the output side disk is allowed to have a residual compressive stress ranging from 40 to 150 kgf/mm$^2$ on a surface layer of the rolling surface thereof, and this contributes to further improving the rolling life of the power roller bearing, the input side disk, and the output side disk, which in turn allows a toroidal-type continuously variable transmission having a longer life to be obtained.

The reason therefor is that by producing a residual compressive stress on the surface layer of the rolling surface of each of the inner race, the outer race, the input side disk, and the output side disk, generation of minute cracks caused by tensile stress in the tangential direction of the surface which is a cause of flaking is controlled to improve fatigue strength.

The effect of improving fatigue strength is noticeably exhibited when the residual compressive stress is equal to or exceeds 40 kgf/mm$^2$. On the other hand, a residual compressive stress in excess of 150 kgf/mm$^2$ causes the rolling portions of the bearing to accumulate fatigue due to heavy machining, thereby impairing fatigue strength. Therefore, it is desirable that a residual compressive stress ranging from 40 to 150 kgf/mm$^2$ be produced on the surface layer of the rolling surface of each of the inner race, the outer race, the input side disk, and the output side disk.

Further, for the same reason as above, a residual compressive stress ranging from 40 to 150 kgf/mm$^2$ is produced on the surface layer of the rolling surface of the rolling element, which is a component of the power roller bearing, and this contributes to further improving the rolling life of the power roller bearing, the input side disk, and the output side disk, which in turn allows a toroidal-type continuously variable transmission having a longer life to be obtained.

EXAMPLES

Figure 5:
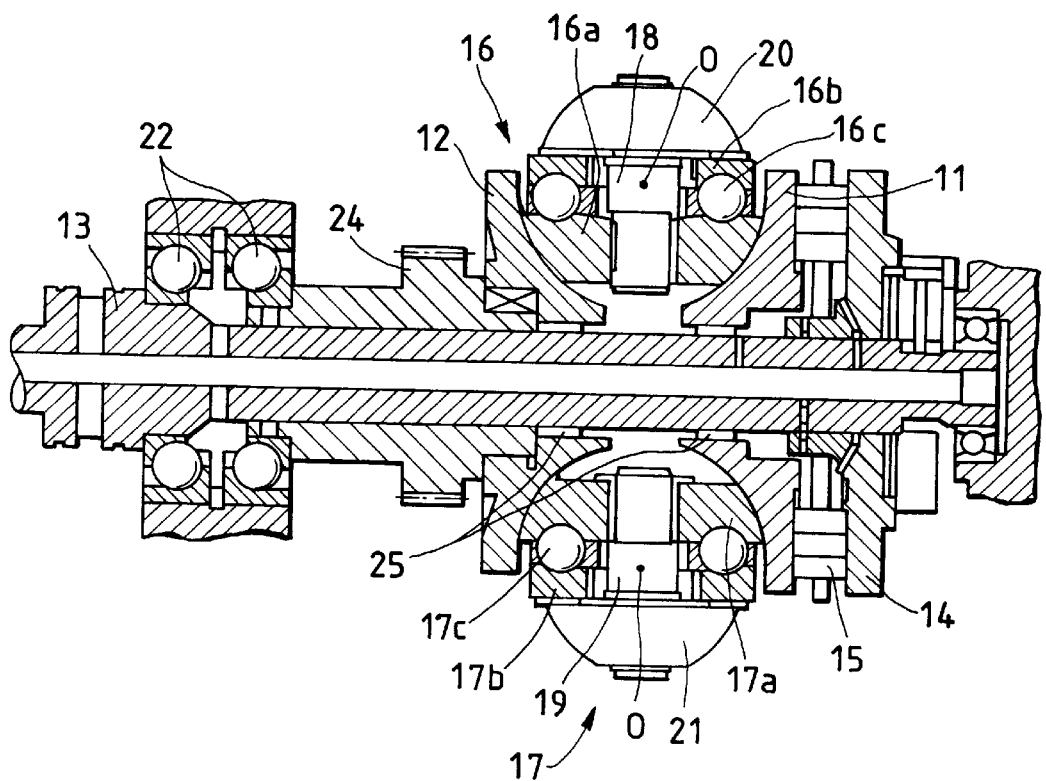
FIG. 5 is a sectional view showing a construction of a toroidal-type continuously variable transmission used in the embodiment of the present invention as well as in the conventional example.

A total of 17 test pieces (steel balls 1 to 17 that are of the same construction as the rolling elements 16c and 17c of the toroidal-type continuously variable transmission 10 shown in FIG. 5) were prepared by selecting one of the materials (materials A to I) shown in Table 1, then subjecting pieces of the selected material to heat treatments shown in Table 2, and further shot peening certain heat-treated pieces as the case may so require.

Similarly, a total of 17 test pieces (inner races, outer races, and disks 1 to 17 that are of the same construction as the power rollers 16a, 17a, the outer races 16b, 17b, and the input side disk 11 and the output side disk 12 of the toroidal-type continuously variable transmission 10 shown in FIG. 5) were prepared by selecting one of the materials (materials A to I) shown in Table 1, then subjecting pieces of the selected material to heat treatment as shown in Table 3, and further shot peening certain heat-treated pieces as the case may so require.

Moreover, heat treatment symbols (heat treatments I to IV) indicated in the column of heat treatment in Tables 2 and 3 correspond to heat treatment numbers indicated in FIGS. 4A to 4D, respectively. Details of the respective heat treatment processes will be described below.

Heat Treatment I

As shown in FIG. 4A, a piece of a material is heat-treated (through hardened) for 0.5 to 1 hour in an Rx gas whose temperature ranges from 840° to 860° C., thereafter oil-quenched, and then heated for 2 hours in the atmosphere whose temperature ranges from 160° to 180° C., and finally cooled (tempered).

Heat Treatment II

As shown in FIG. 4B, a piece of a material is heat-treated (carburized) for 20 to 30 hours in Rx gas and enriched gas whose temperature ranges from 930° to 950° C., self-cooled (or hardened), then heat-treated for 0.5 to 1 hour in Rx gas whose temperature ranges from 840° to 860° C., thereafter oil-quenched, and then heated for 2 hours in the atmosphere whose temperature ranges from 160° to 180° C., and finally cooled (tempered).

Heat Treatment III

As shown in FIG. 4C, a piece of a material is heat-treated (carbonitrided) for 3 to 5 hours in Rx gas, enriched gas, and ammonia (NH$_3$) gas whose temperature ranges from 840° to 860° C., thereafter oil-quenched, and then heated for 2 hours in the atmosphere whose temperature ranges from 160° to 180° C., and finally cooled (tempered).

Heat Treatment IV

As shown in FIG. 4D, a piece of a material is heat-treated (carbonitrided) for 20 to 30 hours in Rx gas, enriched gas, and ammonia (NH$_3$) gas whose temperature ranges from 930° to 950° C., self-cooled, then heat-treated for 0.5 to 1 hour in Rx gas whose temperature ranges from 840° to 860° C., thereafter oil quenched, and then heated for 2 hours in the atmosphere whose temperature ranges from 160° to 180° C., and finally cooled (tempered).

TABLE 1

| Materials | C (%) | Si (%) | Mn (%) | Cr (%) | Mo (%) | O (ppm) | S (%) | P (%) |
|---|---|---|---|---|---|---|---|---|
| A (SUJ2) | 1.00 | 0.25 | 0.4 | 1.51 | — | 8 | 0.008 | 0.016 |
| B SCM420 | 0.20 | 0.20 | 0.7 | 1.05 | 0.2 | 9 | 0.009 | 0.013 |
| C | 0.67 | 0.40 | 0.7 | 1.20 | — | 8 | 0.008 | 0.011 |
| D | 0.30 | 0.50 | 0.8 | 1.50 | 0.3 | 9 | 0.006 | 0.015 |
| E | 0.32 | 1.50 | 0.8 | 1.50 | 1.0 | 8 | 0.008 | 0.012 |
| F | 0.29 | 0.42 | 0.7 | 1.50 | 0.1 | 9 | 0.008 | 0.012 |
| G | 0.30 | 0.59 | 0.8 | 1.50 | 1.1 | 8 | 0.008 | 0.011 |
| H | 0.31 | 1.00 | 0.7 | 1.50 | — | 8 | 0.008 | 0.015 |
| I | 0.30 | 0.25 | 0.7 | 1.50 | 0.8 | 8 | 0.008 | 0.012 |

The residual stress (kgf/mm$^2$) of each of the respective test pieces obtained in Tables 2 and 3 is measured at 50 μm in depth from the surface. The results of the measurements are shown in Tables 2 and 3.

It should be noted that the residual compressive stresses referred to in Tables 2 and 3 are identified as tensile (+) and compressive (−).

Then, toroidal-type continuously variable transmissions such as shown in FIG. 5 were prepared by combining the steel ball shown in Table 2, the inner race, the outer race, and the disks (input and output side disks) shown in Table 3 in such a manner as shown in Table 4.

TABLE 2

| Test Pieces | | Materials | Heat Treatment | Shot Peening | Residual Stress (Kgf/mm$^2$) |
|---|---|---|---|---|---|
| Example | Steel Ball 1 | A | III | None | −19 |
| Example | Steel Ball 2 | C | III | None | −21 |
| Example | Steel Ball 3 | A | III | None | −19 |
| Example | Steel Ball 4 | A | III | None | −19 |
| Example | Steel Ball 5 | A | III | None | −19 |
| Example | Steel Ball 6 | A | III | None | −19 |
| Example | Steel Ball 7 | A | III | None | −19 |
| Example | Steel Ball 8 | A | III | None | −19 |
| Example | Steel Ball 9 | A | III | None | −19 |
| Example | Steel Ball 10 | A | III | None | −19 |
| Example | Steel Ball 11 | A | III | None | −19 |
| Example | Steel Ball 12 | A | III | None | −19 |
| Example | Steel Ball 13 | A | III | None | −19 |
| Example | Steel Ball 14 | A | III | Exist | −74 |
| Example | Steel Ball 15 | A | III | None | −19 |
| Comparative Example | Steel Ball 16 | A | I | None | −2 |
| Comparative Example | Steel Ball 17 | A | I | None | −2 |

TABLE 3

| Test Pieces | Materials | Heat Treatment | Shot Peening | Residual Stress (Kgf/mm²) |
|---|---|---|---|---|
| Example Inner and Outer Races and Disks 1 | B | II | None | −16 |
| Example Inner and Outer Races and Disks 2 | B | II | None | −16 |
| Example Inner and Outer Races and Disks 3 | H | II | None | −17 |
| Example Inner and Outer Races and Disks 4 | I | II | None | −17 |
| Example Inner and Outer Races and Disks 5 | D | II | None | −22 |
| Example Inner and Outer Races and Disks 6 | E | II | None | −20 |
| Example Inner and Outer Races and Disks 7 | E | IV | None | −24 |
| Example Inner and Outer Races and Disks 8 | F | II | None | −21 |
| Example Inner and Outer Races and Disks 9 | G | II | None | −22 |
| Example Inner and Outer Races and Disks 10 | B | II | Exist | −42 |
| Example Inner and Outer Races and Disks 11 | B | II | Exist | −147 |
| Example Inner and Outer Races and Disks 12 | B | II | Exist | −160 |
| Example Inner and Outer Races and Disks 13 | E | IV | Exist | −69 |
| Example Inner and Outer Races and Disks 14 | E | IV | Exist | −69 |
| Example Inner and Outer Races and Disks 15 | E | II | Exist | −65 |
| Comparative Example Inner and Outer Races and Disks 16 | A | I | None | +8 |
| Comparative Example Inner and Outer Races and Disks 17 | B | II | None | −16 |

Thereafter, the life of the power roller bearings (the steel ball, the inner and outer races) and disks (the input and output side disks) of the thus obtained respective toroidal-type continuously variable transmissions (Examples 1 to 15 and Comparative Examples 1 and 2) were tested under the following conditions.

(Test Conditions)
Number of revolutions of the input shaft

| | |
|---|---|
| | 4000 r.p.m. |
| Input torque | 350 N · m |
| Used oil | Synthetic lubricating oil |
| Oil temperature | 100° C. |
| Number of tests | 7 |

The life ($L_{10}$ life) of the power roller bearings and the disks was verified by the presence of flaking on the rolling surfaces of the power roller bearings, the rolling surfaces of both disks, or on the steel balls (rolling elements) which can be visibly checked by the naked eye or with a magnifying glass. The quantitative expression ($L_{10}$ life) of the results of these life tests was obtained in terms of time (in hours) until 10% of the rolling surfaces of the power roller bearings, the rolling surfaces of both disks, and the steel balls (rolling element) reach their life based on the 7 measurements.

The results of these tests are shown in Table 4.

TABLE 4

| Test Pieces | | | | | Occurrence of Flaking | | |
|---|---|---|---|---|---|---|---|
| | Steel Ball | Inner and Outer Races, and Disks | Number of Test | $L_{10}$ Lives (Time) | Steel Ball | Inner and Outer Races | Disks |
| Example 1 | 1 | 1 | 7 | 199 | 0 | 6/7 | 1/7 |
| Example 2 | 2 | 2 | 7 | 173 | 0 | 6/7 | 117 |
| Example 3 | 3 | 3 | 7 | 283 | 0 | 7/7 | 0 |
| Example 4 | 4 | 4 | 7 | 273 | 0 | 7/7 | 0 |
| Example 5 | 5 | 5 | 7 | 311 | 0 | 7/7 | 0 |
| Example 6 | 6 | 6 | 7 | 488 | 1/7 | 5/7 | 1/7 |
| Example 7 | 7 | 7 | 7 | 630 | 2/7 | 4/7 | 1/7 |
| Example 8 | 8 | 8 | 7 | 221 | 0 | 7/7 | 0 |
| Example 9 | 9 | 9 | 7 | 332 | 0 | 5/7 | 2/7 |
| Example 10 | 10 | 10 | 7 | 294 | 0 | 7/7 | 0 |
| Example 11 | 11 | 11 | 7 | 341 | 0 | 7/7 | 0 |
| Example 12 | 12 | 12 | 7 | 146 | 0 | 6/7 | 1/7 |
| Example 13 | 13 | 13 | 7 | 804 | 3/7 | 2/7 | 2/7 |
| Example 14 | 14 | 14 | 7 | 980 | 1/7 | 5/7 | 1/7 |
| Example 15 | 15 | 15 | 7 | 690 | 2/7 | 3/7 | 2/7 |
| Comparative Example 1 | 16 | 16 | 7 | 71 | 7/7 | 0 | 0 |
| Comparative Example 2 | 17 | 17 | 7 | 76 | 7/7 | 0 | 0 |

From Table 4, it is verified that the toroidal-type continuously variable transmissions (Comparative Examples 1 and 2) using the steel balls obtained by subjecting material A (SUJ2) to the ordinary heat treatment (heat treatment I) have $L_{10}$ lives greatly shorter than the other toroidal-type continuously variable transmissions (Examples 1 to 15).

On the other hand, it is also understood that the toroidal-type continuously variable transmissions (Examples 1 to 15) using the steel balls obtained by subjecting material A (SUJ2), or material C (medium-carbon steel) to the carbonitriding process and the hardening and tempering treatments (heat treatment III) have $L_{10}$ lives greatly longer than the other toroidal-type continuously variable transmissions (Comparative Examples 1 and 2) with the presence of damaged parts shifting from the steel balls to the inner and outer races and to the disks.

This improvement in $L_{10}$ life is obtained by strengthening the steel ball, which is the weakest part under the operating conditions of the toroidal-type continuously variable transmission.

It is also understood that when the case (Examples 1 and 2 of using material B (SCM420, which is an ordinary case hardening steel) in which the material of which the inner and outer races and the disks are made is compared with the case (Examples 3 to 7) of using materials D, E, I, and H (steels to be case hardened having silicon (Si) or molybdenum (Mo) added in appropriate amounts), Examples 3 to 7 exhibit an improvement in $L_{10}$ life.

The reason therefor is that the resisting property for temper softening is improved by adding at least one of silicon (Si) and molybdenum (Mo) in appropriate amounts.

It is further verified that although Example 8 using material F as the material of which the inner and outer races and the disks are made exhibits improvement in $L_{10}$ life compared with Comparative Examples 1 and 2, the improvement in $L_{10}$ life of Example 8 is not as large as that of Examples 3 to 7 because the amounts of both the silicon (Si) and molybdenum (Mo) added in Example 8 are not appropriate.

It is still further understood from Example 9 using material G as the material of which the inner and outer races and the disks are made that excessive addition of molybdenum (Mo) is not contributory to improving the life.

It is still further verified that the toroidal-type continuously variable transmissions (Examples 10 and 11) using the inner and outer races and the disks having appropriate residual compressive stresses on the surfaces thereof by shot peening exhibit improvement in $L_{10}$ life.

The reason therefor is that generation of minute cracks that causes flaking is controlled by producing optimal residual compressive stresses on the surface layers of the rolling inner and outer races and the disks. Accordingly, it has been proven that the life can be improved by producing a residual compressive stress ranging from 40 to 150 kgf/mm$^2$ on the surface layers of the rolling surfaces of the inner and outer races and the disks.

On the other hand, it is also understood that the toroidal-type continuously variable transmission (Example 12) using the inner and outer races and the disks whose residual compressive stresses produced by shot peening are not as optimally specified exhibits improvement in $L_{10}$ life compared with Comparative Examples 1 and 2, but such improvement is not so large as that exhibited by Examples 10 and 11.

The reason therefor may reside in the assumption that the negative effect brought about by the material being subjected to fatigue due to heavy machining on the surfaces prevails over the effect of controlling the generation of minutes cracks caused by the optimal residual compressive stress.

It is still further verified that the toroidal-type continuously variable transmissions (Examples 13 to 15) obtained by using material E (the material having at least one of silicon (Si) and molybdenum (Mo) added in an appropriate amount) as the material of which the inner and outer races and the disks are made, subjecting the material to carburizing or carbonitriding and to hardening and tempering treatments, and using the inner and outer races and disks having optimal residual compressive stresses on the surfaces thereof exhibit significant improvement in $L_{10}$ life.

Then, a relationship between the tempering temperature (°C.) and the hardness of test pieces (HV) is analyzed to evaluate the resisting property for temper softening when the test pieces of material A (SUJ2) are subjected to heat treatments I', II' and III'. These heat treatments vary the tempering temperature in comparison with the heat treatments I, II and III as shown in FIGS. 4A to 4D. The result of the analysis is shown in FIG. 1.

Moreover, the amount of carbon on the surface in treatment II' is 1.3 wt %, and the amounts of carbon and nitrogen on the surface in heat treatment III' is 1.3 wt % and 0.3 wt %, respectively.

As shown in FIG. 1, it is understood that reduction in hardness of the test pieces obtained by heat treatment I' is larger than that by heat treatment processes II' and III', which in turn allows us to verify that heat treatment processes II' and III' contribute to improving the resisting property for temper softening compared with heat treatment I'. Particularly, heat treatment III' exhibits a significant improvement in the resisting property for temper softening.

Then, a relationship between the tempering temperature (°C.) and the hardness of test pieces (HV) was analyzed to evaluate the resisting property for temper softening when the test pieces of materials B, D, E, and F are subjected to the same heat treatment II' (which varies the tempering temperature in comparison with the heat treatment II as shown in FIG. 4B). The result of the analysis is shown in FIG. 2.

Figure 2:
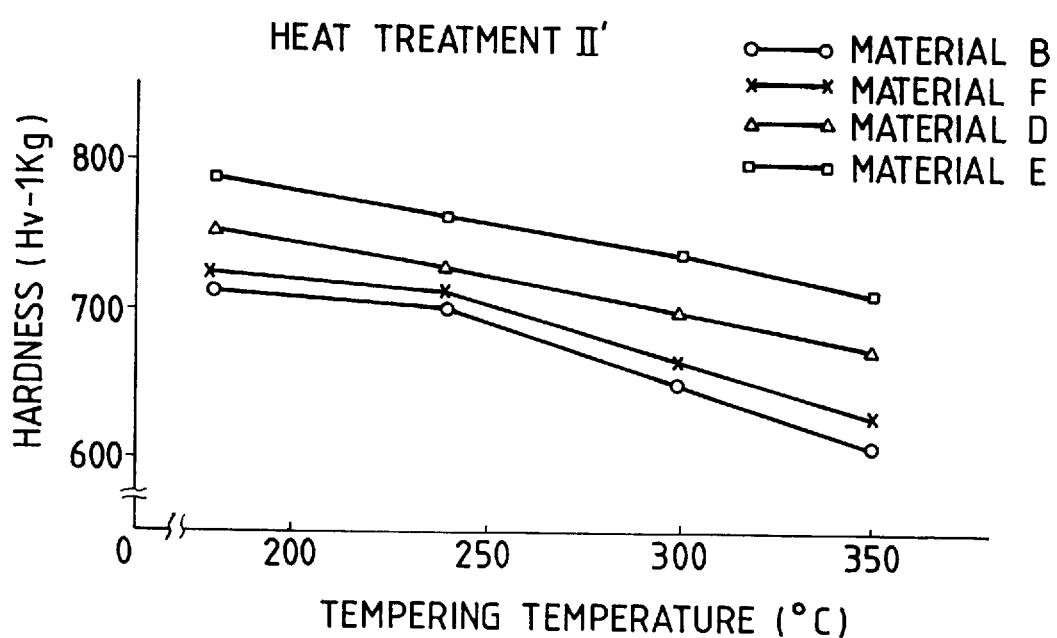
FIG. 2 is a diagram showing a relationship between the tempering temperature and the hardness of test pieces (HV) when the test pieces of materials B, D, E and F used in the embodiment of the present invention are subjected to a single heat treatment.

As shown in FIG. 2, it is understood that the materials (materials D, E, and F) whose silicon (Si) content ranges from 0.5 wt % to 1.5 wt % exhibit improvement in hardness compared with material B whose silicon (Si) content is less than 0.5 wt %, and therefore exhibit the excellent resisting property for temper softening.

Then, a relationship between the tempering temperature (°C.) and the hardness of test pieces (HV) was analyzed to evaluate the resisting property for temper softening when the test pieces of materials B, D, E, F, and G are subjected to the same heat treatment II'. The result of the analysis is shown in FIG. 3.

Figure 3:
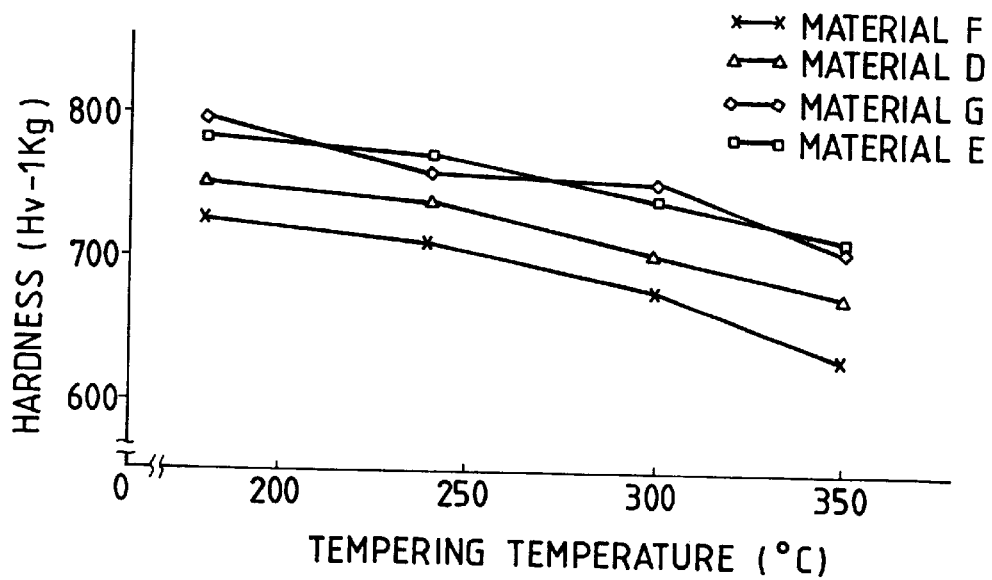
FIG. 3 is a diagram showing a relationship between the tempering temperature and the hardness of test pieces (HV) when the test pieces of materials B, D, E, F and G are subjected to a single heat treatment.

As shown in FIG. 3, it is understood that the materials (materials D, E, F, and G) whose molybdenum (Mo) content ranges from 0.3 wt % to 1.0 wt % exhibit improvement in hardness compared with the material B (as shown in FIG. 2) whose molybdenum (Mo) content is less than 0.3 wt %, and therefore exhibit the excellent resisting property for temper softening. Moreover, although the above-described embodiment mentions a single cavity-type of the toroidal-type continuously variable transmission as an example, the present invention can be applied to a double cavity-type transmission.

As described in the foregoing, the toroidal-type continuously variable transmission of the present invention is characterized as having the rolling element of the power roller bearing made of a medium-carbon steel or a high-carbon steel, and subjected to a carbonitriding process and hardening and tempering treatments. Therefore, the resisting property for temper softening the rolling element can be improved, which in turn prevents hardness thereof at high temperatures from being reduced. In addition, the martensite transformation temperature of the case of the rolling element may be made different from that of the core thereof. Therefore, an optimal residual compressive stress is produced on the surface of the rolling element after the hardening and tempering treatments. Hence, generation of minute cracks caused by tensile stress present in the tangential direction with respect to the surface can be controlled, which in turn improves fatigue strength.

As a result, the rolling life of the power roller bearing and the input and output side disks is improved, which in turn allows a toroidal-type continuously variable transmission having a long life to be provided.

Further, each of the inner race and the outer race, which are components of the power roller bearing, and the input side disk and the output side disk is made of a case hardened steel containing at least one of silicon (Si) in an amount ranging from 0.5 wt % to 1.5 wt % and molybdenum (Mo) in an amount ranging from 0.3 wt % to 1.0 wt %, and is subjected to a carburizing or carbonitriding process and to hardening and tempering treatments, and the thus obtained inner and outer races and input and output side disks are combined with the rolling elements according to the present invention. Such combination contributes to further improving the rolling life of the power roller bearing, the input side disk, and the output side disk, which in turn allows a toroidal-type continuously variable transmission having a longer life to be obtained.

Moreover, the steels to be case hardened and the medium- or high-carbon steel contains oxygen (O) in an amount of 9 ppm or less, sulfur (S) in an amount of 0.010 wt % or less, and phosphorus (P) in an amount of 0.020 wt % or less. This contributes to further improving the rolling life of the power roller bearing, the input side disk, and the output side disk, which in turn allows a toroidal-type continuously variable transmission having a longer life to be obtained.

Still further, each of the inner race and the outer race, which are components of the power roller bearing, and the input side disk and the output side disk is allowed to have a residual compressive stress ranging from 40 to 150 kgf/mm$^2$ on a surface layer of the rolling surface thereof, and this contributes to further improving the rolling life of the power roller bearing, the input side disk, and the output side disk, which in turn allows a toroidal-type continuously variable transmission having a longer life to be obtained.

Still further, a residual compressive stress ranging from 40 to 150 kgf/mm$^2$ is produced on the surface layer of the rolling surface of the rolling element, which is a component of the power roller bearing, and this contributes to further improving the rolling life of the power roller bearing, the input side disk, and the output side disk, which in turn allows a toroidal-type continuously variable transmission having a longer life to be obtained.

What is claimed is:

1. A toroidal-type continuously variable transmission comprising:

an input side disk disposed on an input shaft;

an output side disk disposed on an output shaft; and a pair of power roller bearings disposed between the input and output side disks, each of the bearings including an inner race, an outer race, and a plurality of rolling elements interposed between the inner and outer races and transmitting motive power of the input shaft to the output shaft while engaging the inner race with the input and output side disks, wherein each of the rolling elements has a residual compressive stress ranging from 19 to 74 kgf/mm$^2$ in its rolling surface, and wherein each of the rolling elements has carbon and nitrogen dissolved in a surface layer of its rolling surface by means of a carbonitriding treatment.

2. The toroidal-type continuously variable transmission of claim 1, wherein each of the rolling elements has a residual compressive stress ranging from 40 to 150 kgf/mm$^2$ on a surface layer of a rolling surface thereof.

3. The toroidal-type continuously variable transmission of claim 1, wherein each of said rolling elements has a surface hardness of HV700 or more after a tempering treatment at a tempering temperature of 300° C. or more.

4. The toroidal-type continuously variable transmission of claim 1, wherein each of the rolling elements is made of a steel containing carbon in an amount of at least 0.2 wt % with the balance being Fe.

5. The toroidal-type continuously variable transmission of claim 4, wherein the steel contains oxygen in an amount of 9 ppm or less, sulfur in an amount of 0.010 wt % or less, and phosphorus in an amount of 0.020 wt % or less.

6. The toroidal-type continuously variable transmission according to claim 1, wherein each of the inner race and the outer race of the power roller bearings, and the input side disk and the output side disk has a residual compressive stress ranging from 16 to 160 kgf/mm$^2$ in its rolling surface layer.

7. The toroidal-type continuously variable transmission of claim 6, wherein each of the inner races and the outer races of the power roller bearings, and the input side disk and the output side disk is made of a steel to be case hardened containing at least one of silicon in an amount ranging from 0.5 wt % to 1.5 wt % and molybdenum in an amount ranging from 0.3 wt % to 1.0 wt %, with the balance being Fe.

8. The toroidal-type continuously variable transmission of claim 7, wherein each of the inner races and the outer races of the power roller bearings, and the input side disk and the output side disk is subjected to a carburizing process or a carbonitriding process and to hardening and tempering treatments.

9. The toroidal-type continuously variable transmission of claim 7, wherein the steel contains oxygen in an amount of 9 ppm or less, sulfur in an amount of 0.010 wt % or less, and phosphorus in an amount of 0.020 wt % or less.

10. The toroidal-type continuously variable transmission of claim 6, wherein each of the inner and outer races of the power roller bearings, and the input and output side disks has a residual compressive stress ranging from 40 to 150 kgf/mm$^2$ on a surface layer of a rolling surface thereof.

11. The toroidal-type continuously variable transmission of claim 6, wherein each of the rolling elements has a residual compressive stress ranging from 40 to 150 kgf/mm$^2$ on a surface layer of a rolling surface thereof.

12. The toroidal-type continuously variable transmission of claim 6, wherein each of said input side disk and the output side disk has a surface hardness of HV700 or more after a tempering treatment at a tempering temperature of 300° C. or more.

* * * * *